United States Patent

[11] 3,627,817

[72] Inventors Clive Barnett;
John Dewing; Anthony Howden Jubb, all of Runcorn, England
[21] Appl. No. 770,825
[22] Filed Oct. 25, 1968
[45] Patented Dec. 14, 1971
[73] Assignee Imperial Chemical Industries Limited
London, England
[32] Priority Nov. 6, 1967
[33] Great Britain
[31] 50,334/67

[54] PROCESS FOR PREPARING ALIPHATIC DINITRILES FROM CYCLOHEXANE OR CYCLOHEXENE
5 Claims, No Drawings
[52] U.S. Cl.................................................. 260/465.3
[51] Int. Cl............................................C07c 121/02, C07c 121/26

[50] Field of Search............................................ 260/465.3

[56] References Cited
UNITED STATES PATENTS
| | | | |
|---|---|---|---|
| 3,152,170 | 10/1964 | Barclay et al............... | 260/465.3 |
| 3,269,957 | 8/1966 | Bethell........................ | 260/465.3 X |

FOREIGN PATENTS
| | | | |
|---|---|---|---|
| 42/11805 | 5/1967 | Japan............................ | 260/465.3 |
| 42/11808 | 5/1967 | Japan............................ | 260/465.3 |

Primary Examiner—Joseph P. Brust
Attorney—Cushman, Darby & Cushman

ABSTRACT: A process for the preparation of aliphatic dinitriles, particularly adiponitrile, by reacting cyclohexane or cyclohexene with ammonia and oxygen at elevated temperature in the presence of an antimony oxide catalyst.

PROCESS FOR PREPARING ALIPHATIC DINITRILES FROM CYCLOHEXANE OR CYCLOHEXENE

This invention relates to a process for the manufacture of aliphatic dinitriles, and especially to the manufacture of adiponitrile by the ammoxidation of cyclohexane or cyclohexene.

According to the present invention, a process for the preparation of aliphatic dinitriles comprises contacting a gaseous mixture comprising cyclohexane or cyclohexene, singly or in admixture, ammonia and oxygen with a solid catalyst containing an oxide of antimony at an elevated temperature. The temperature of reaction is generally from 300° to 700° C., and preferably from 350° to 550° C.

The catalyst may consist of antimony oxide alone or in admixture with one or more other oxides. When not used alone the antimony oxide is preferably mixed with a tin or uranium oxide, but other oxides, for example, those of iron, thorium, cerium, manganese, samarium, titanium, the mixture of rare earths known as didymium, lanthanum, bismuth, thallium, zinc, lead or cadmium may be used in addition to or instead of the tin or uranium oxide.

When antimony oxide is used alone it may be present as the trioxide, tetroxide or pentoxide or as a mixture of two or more of these oxides. When oxides of other metals are present they may take the form of separate metal oxides incorporated in the catalyst by physical mixing, alternatively they may be present in chemical combination with the antimony oxide, for example as an antimonate; the essential requirement is that the catalyst should consist essentially of antimony, optionally with one or more other metals, and oxygen.

The oxide or mixed oxide catalysts may be prepared by mixing the individual oxides; it is also possible to prepare them from substances which yield oxides on heating, for example, hydroxides or hydrated oxides, such as metastannic acid. When mixed oxides are required it is often convenient to prepare them by coprecipitation of the hydroxides or hydrated oxides of the required metals by hydrolysis of a solution of their salts, for example, the halides. The precipitate may then be filtered, dried and calcined to yield the mixed oxides. This method of preparation has the advantage of ensuring intimate mixing of the oxides. It may also be possible to prepare a suitable catalyst by precipitation of the antimonate or pyroantimonate of the other metal followed by filtration and calcining as before.

There may be considerable variation in the ratio of antimony oxide to other metal oxide, but generally it is in the range 10:1 to 1:10 by weight. The oxide or oxides are preferably used in granular form to facilitate gas/solid contact. They may be used alone or mixed with an inert solid diluent, such as silica or alumina. The presence of an inert diluent allows closer control of the reaction conditions. It is also possible to use an inert support such as alumina or kaolin, in which case it is most convenient to impregnate the support with a solution which will yield the appropriate oxide or oxides on drying and calcining. The inert diluent may be present in amount up to 90 percent by volume of the catalyst mixture; but 60–70 percent by volume is generally convenient.

The oxides or mixed oxides may be used as prepared; but it is preferred that they are preheated before use, especially if such treatment has not formed part of their preparation. The temperature of such heat treatment may be from 550° C. to 650° C., but higher temperatures may be used if desired. However, it is preferred that the heat treatment temperature is at least as high as that at which the catalyst is to be used.

The gas feed in our process comprises cyclohexane or cyclohexene, oxygen and ammonia, the cyclohexane and cyclohexene, which may be present singly or in admixture, being hereinafter referred to as the "hydrocarbon feed."

The ratio of hydrocarbon feed to ammonia may suitably be from 1:3 to 7:1, and the ratio of oxygen to hydrocarbon from 1:3 to 8:1, both ratios being on a volume basis. The presence of an inert gas, such as nitrogen and/or water vapor, may be tolerated in the gas feed and, especially in the case of nitrogen, may be desirable. In some circumstances the nitrogen may account for as much as 50 or 60 percent by volume of the feed gas so that air may be used as an inexpensive source of oxygen. Typically the hydrocarbon content of the feed gases may be from 3 to 8 percent by volume, but may be varied over much wider limits, for example, from 1 to 20 percent.

The process is preferably operated on a continuous basis, with mean gas feed/catalyst contact times from 0.4 to 5 seconds. By "contact time" we mean a figure, in seconds, obtained by dividing the volume of catalyst by the gas flow per second. Pressures used are normally atmospheric or slightly higher to enable suitable control of throughput of the gas feed, but will generally not exceed 5 atmospheres. Temperature of reaction will ordinarily be in the range 350° C. to 550° C.; but the optimum value will tend to vary with different catalyst/gas feed combinations. However, it may be readily determined for any particular combination, for example, by varying the reaction temperature and continually monitoring conversion and selectivity until optimum values are obtained.

The process of our invention may be carried out in any suitable manner by which a gaseous feedstock may be contracted with a solid, particulate catalyst. For example, the feed gas may be passed through a heated, tubular reactor packed with granulated catalyst, alternatively, a fluid bed may be used.

The particulate size of the catalyst components is not critical, but should be within the range normally used in fixed bed and fluid bed reactors. The optimum size for any application will depend on the size and proportions of the reactor and on balancing such factors as providing high surface area of catalyst, avoiding close packing of catalyst which is liable to impede gas flow and on whether a fixed or fluid bed is used. When the catalyst is of the multicomponent type e.g. mixed oxide and/or oxide/diluent, it is preferred that the various components have similar particle sizes to facilitate mixing and to minimize the effects of segregation under the influence of the gas flow.

Normally a mixture of dinitriles is produced, comprising adiponitrile, glutaronitrile and succinonitrile. Adiponitrile, which is usually the principal dinitrile present in the product, is useful as an intermediate in high polymer production.

The dinitriles may be recovered from the reaction products by conventional techniques, such as absorption in a solvent or condensation. For example, in a preferred method, the effluent gases are condensed in a cold trap cooled with a solid carbon dioxide/methanol mixture. The liquid condensation product may then be analyzed by any convenient means, for example by gas/liquid chromatography.

The process of the invention is illustrated by the following examples.

GENERAL PROCEDURE

1. Catalyst Preparation a. Antimony/Tin Oxide Catalysts 334.2 g. of $SnCl_4 \cdot 5H_2O$ were dissolved at room temperature in 500 ml. of 1 percent HCl solution to form a colorless solution. This solution and 250 ml. (575 g.) of $SbCl_5$ were added dropwise to 2 liters of cold distilled water, while vigorously stirring the water. A solid precipitate formed and HCl fumes were evolved. The temperature of the aqueous mixture rose to about 60° C. When the addition of the two solutions was complete the mixtures were cooled with stirring to room temperature. Concentrated ammonia (specific gravity 0.88) was then added to the aqueous mixture, while stirring vigorously, to adjust the pH to about 5. In the course of the additions of the ammonia, the mixture became hot, reaching a temperature of about 60° C. The resultant mixture was then cooled, while stirring slowly, to room temperature, and filtered under suction to separate the fine white precipitate. The catalytic properties of the eventual combined oxides were found to be impaired by digesting the acidic liquor containing the precipitated oxides at an elevated temperature (e.g. 96° C.) before the ammonia addition but subsequent filtration is facilitated by such digestion. The precipitate was washed with cold distilled water (10×200 ml.) dried at 150° C. for 12 hours, heated at 380° C. for 4 hours, and finally heated at 550° C. for 18 hours. The resulting greenish brown solid, containing 46.28 percent by weight Sb and 25.71 percent by weight Sn, was ground to between 10 and 30 mesh B.S.S. and became the catalyst in the following ammoxidation process.

The catalyst prepared in the above way had an antimony/tin ratio of 2:1. Catalysts having antimony/tin ratios of 4:1, 3:1 and 1:2 were prepared by analogous procedures using the appropriate quantities of $SnCl_4 \cdot 5H_2O$ and $SbCl_5$.

b. Antimony/Uranium Oxide Catalyst 10.8 g. of Uranyl acetate and 60 g. of $SbCl_5$ were added separately to 1,500 ml. of water, and the pH of the mixture adjusted to 8 with concentrated ammonia. The precipitate formed was filtered, washed and calcined, using the general procedure given under (a) above. The antimony/uranium ratio was 2:1.

c. Antimony/Titanium Oxide Catalyst 59.0 g. of Antimony pentachloride and 0.1 mole of titanium tetrachloride in 10 percent hydrochloric acid were added dropwise to 1 liter of water at equal rates. The mixture was heated at 90°–100° C. for 10 hours and 250 ml. of water was added. After cooling 0.880 ammonia was added to bring the suspension to pH 8. The precipitate was filtered off, washed and calcined using the general procedure given under (a). The antimony/titanium ratio was 2:1.

In each of the above preparations, the solid oxide produced was sieved, the fraction between 10 and 30 mesh B.S.S. being retained. This was mixed with twice its own weight of silica chips of the same particle size and the mixtures used as catalysts in the appropriate examples.

2. Ammoxidation Procedure

A feed gas was made up by mixing streams of cyclohexane, ammonia, air and nitrogen in the required proportions. The rate of flow of feed gas through a tubular reactor containing the appropriate catalyst was 9 to 18 liters per hour and the catalyst volume was about 10 ml., giving contact times in the range 1.0 to 4.0 seconds. The appropriate contact time is stated in each example.

The components of the feed gas were supplied to a mixing vessel, comprising a glass bulb packed with glass helices and maintained at a temperature of 100° C., via separate rotary flow meters. From the mixing vessel the gas stream was passed to the reactor vessel which incorporated a preheater section containing silica chips (10 to 30 mesh B.S.S.) at reaction temperature, and, following thereon, a principal section containing the ammoxidation catalyst dispersed with twice its own volume of silica chips, the catalyst and the silica chips being of 10 to 30 mesh B.S.S. particle size.

The effluent from the reactor was passed into a cold trap immersed in a solid carbon dioxide/methanol mixture. The liquid condensation product was then analyzed by gas/liquid chromatography.

The results in the following examples include figures for "-conversion" and "selectivity." Conversion refers to that proportion of the hydrocarbon feed which has reacted, and selectivity refers to the proportion of hydrocarbon feed which has formed the appropriate dinitrile.

EXAMPLE 1

Using the general conditions detailed above, cyclohexane was ammoxidized at a temperature of 450° C., with a mean contact time of 1.95 seconds, to a mixture of adiponitrile (ADN), glutaronitrile (GN) and succinonitrile (SN). The catalyst used was an Sb/Sn oxide mixture having an Sb/Sn ratio of 2:1. The gas feed composition was (by volume): 5 percent cyclohexane, 6.6 percent $NH_3$, 50 percent air and 38.4 percent $N_2$.

Analysis of the effluent gave the following results:
Conversion of cyclohexane 19.3%
Selectivity with respect to ADN 23.7%
GN 14.2%
SN 3.5%

EXAMPLE 2

Conditions as for example 1 except that reaction temperature was 550° C.

Conversion of cyclohexane 27.2%
Selectivity with respect to ADN 14.1%
GN 10.6%
SN 2.2%

EXAMPLE 3

Conditions as for example 1 except that contact time was 3.9 seconds.

Conversion to cyclohexane 21.4%
Selectivity with respect to ADN 22.9%
GN 13.7%
SN 3.9%

EXAMPLE 4

Using the same general procedure, cyclohexane was ammoxidized at a temperature of 445° C. with a mean contact time of 2.0 seconds and an Sb/Sn oxide catalyst having an Sb/Sn ratio of 4:1. The gas feed composition was: 5 percent cyclohexane, 10 percent $NH_3$, 50 percent air, remainder $N_2$.

Conversion of cyclohexane 12.4%
Selectivity with respect to ADN 18.7%
GN 18.3%
SN 5.1%

EXAMPLE 5

The procedure of example 4 was repeated using a catalyst with an Sb/Sn ratio of 1:2. The temperature of reaction was 470° C.

Conversion of cyclohexane 14.3%
Selectivity with respect to ADN 14.1%
GN 15.7%
SN 1.3%

EXAMPLE 6

The procedure of example 4 was repeated using a catalyst with an Sb/Sn ratio of 3:1. The temperature of reaction was 430° C. and contact time 1.5 seconds. The gas feed composition was 8.4 percent cyclohexane, 14 percent $NH_3$, 50 percent air, remainder $N_2$.

Conversion of cyclohexane 19.5%
selectivity with respect to ADN 21.7%
GN 12.4%
SN 5.1%

EXAMPLE 7

Cyclohexane was ammoxidized using the same general procedure with an Sb/U oxide catalyst, at a temperature of 435° C. and contact time of 2.0 seconds. The gas feed composition was the same as for example 4.

Conversion of cyclohexane 21.3%
Selectivity with respect to ADN 24.3%
GN 10.3%
SN 4.0%

EXAMPLE 8

Cyclohexane was ammoxidized using the same general procedure with an Sb/Ti oxide catalyst at a temperature of 440° C. and contact time of 2.0 seconds. The gas feed composition was: 7 percent cyclohexane, 14 percent $NH_3$, 70 percent air, remainder $N_2$.

| | |
|---|---|
| Conversion of cyclohexane | 24.2% |
| Selectivity with respect to ADN | 19.7% |
| GN | 13.5% |
| SN | 5.9% |

What we claim is:

1. A process for the preparation of adiponitrile which comprises contacting a gaseous reaction mixture consisting essentially of cyclohexane, ammonia and oxygen at a temperature of 300° C. to 700° C. with a solid catalyst consisting essentially of (1) a physical mixture of antimony oxide and an oxide of another metal selected from the group consisting of tin, uranium and titanium or (2) an oxide wherein the antimony and said other metal are chemically combined with the oxygen, the ratio of antimony to other metal being in the range of 10:1 to 1:10 by weight.

2. A process according to claim 1 wherein the cyclohexane constitutes from 1 to 20 percent by volume of the reactants, the ratio of cyclohexane to ammonia is from 1:3 to 7:1 by volume, and the ratio of oxygen to cyclohexane is from 1:3 to 8:1 by volume.

3. A process according to claim 1 when conducted at a temperature from 350° to 550° C.

4. A process according to claim 1 wherein the catalyst consists essentially of an oxide of antimony and tin, the atomic ratio of antimony to tin being from 1:2 to 4:1.

5. A process according to claim 1 wherein the catalyst is preheated before use to a temperature of 550° to 650° C.

* * * * *